(12) United States Patent
Spekowius et al.

(10) Patent No.: US 6,618,056 B1
(45) Date of Patent: Sep. 9, 2003

(54) DISPLAY DEVICE WITH IMPROVED REPRESENTATION OF THE SHADES OF GREY

(75) Inventors: Gerhard Spekowius, Aachen (DE); Harald Reiter, Aachen (DE); Martin Weibrecht, Aachen (DE); Peter Quadflieg, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/622,297
(22) PCT Filed: Nov. 29, 1999
(86) PCT No.: PCT/EP99/09265
§ 371 (c)(1),
(2), (4) Date: Aug. 15, 2000
(87) PCT Pub. No.: WO00/36825
PCT Pub. Date: Jun. 22, 2000

(30) Foreign Application Priority Data
Dec. 15, 1998 (DE) .......................... 198 57 761

(51) Int. Cl.$^7$ ................................. G09G 5/10
(52) U.S. Cl. .................. 345/690; 345/207; 345/589; 348/671
(58) Field of Search .................. 345/20, 589, 596, 345/690, 698, 699, 207; 348/671, 673, 674, 678

(56) References Cited

U.S. PATENT DOCUMENTS

| | | | | | |
|---|---|---|---|---|---|
| 3,649,755 A | * | 3/1972 | Newman | ...................... | 315/10 |
| 4,340,904 A | * | 7/1982 | Wingrove, Jr. | ............... | 358/29 |
| 4,992,862 A | * | 2/1991 | Gabor | ........................ | 358/518 |
| 5,155,478 A | * | 10/1992 | Sekiya et al. | ............... | 340/793 |
| 5,506,699 A | * | 4/1996 | Wong | ........................ | 358/456 |
| 5,552,800 A | * | 9/1996 | Uchikoga et al. | ............. | 345/89 |
| 5,883,985 A | * | 3/1999 | Pourjavid | ................... | 382/274 |
| 6,278,496 B1 | * | 8/2001 | Kitagawa et al. | ........... | 348/678 |

* cited by examiner

*Primary Examiner*—Dennis-Doon Chow
(74) *Attorney, Agent, or Firm*—John Vodopia

(57) ABSTRACT

The invention relates to a display device for rendering gray tone images on a monitor controlled by s electron rays. The display device includes a correction unit for generating s output image signals $A_s$ composed of gray tone values forming part of a set K of correction gray tones from an image signal. The image signal is composed of gray tone values forming part of a set M of original gray tones, and the s output image signals $A_s$, after a D/A conversion, are fed each to one electron ray for a brightness-corrected rendering of a gray tone in one pixel of the monitor for the purpose of adapting the brightness distribution of the monitor to the optimum perceptional brightness distribution.

13 Claims, 2 Drawing Sheets

DISPLAY DEVICE WITH IMPROVED REPRESENTATION OF THE SHADES OF GREY

BACKGROUND OF THE INVENTION

1. Field of the Invention

The invention relates to a display device for displaying gray tone images with a monitor driven by s electron rays.

2. Description of the Related Art

Images used, for example, for diagnostic purposes are usually displayed as gray tone images in medical technology. The smallest details are important in the display of these medical images. The object is accordingly to achieve an optimized display with a large number of brightness levels which are distinguishable by the human eye.

WO 96/19899-A3 describes a monochromatic monitor which is driven with three electron guns (triple gun). These three electron rays are imaged in a single point. The image information with which these electron rays are fed, however, is always the same. The generation of a pixel by three electron rays achieves a high brightness and a high sharpness.

Monitors have a representation curve which differs from the optimum perceptional representation curve. Typical monitor curves show an insufficient resolution of the individual gray tones in the low or darker gray tone region. The insufficient resolution of the gray tones in this region means that different gray tones cannot be distinguished or that several different gray tones are displayed as only one gray tone value. To render these differences in gray tones visible or to correct them, a correction in the brightness distribution of the monitor representation curve is to be carried out.

In prior-art correction arrangements, the same number of gray tone values is assigned to a corresponding number of gray tone values. The assignment instruction for correcting the brightness distribution of the monitor, or the representation curve thereof, thus assigns the same gray tone values of the output video signal to several gray tone values of an input video signal, which leads to a loss in displayable gray tone values.

SUMMARY OF THE INVENTION

It is accordingly an object of the invention to provide a simple device for adapting the brightness distribution of the monitor to the optimum perceptional brightness distribution.

According to the invention, this object is achieved in that a correction unit is provided for generating s output image signals $A_s$ (i.e., s>1), which comprise gray tone values forming part of a set K of correction gray tones, from an image signal which contains gray tone values forming part of a set M of original gray tones, and in that said s output image signals $A_s$, after a D/A conversion, are designed to be supplied each to an electron ray of the monitor for a brightness-corrected display of a gray tone in a point of the monitor.

Each monitor has an individual brightness distribution where the problems mentioned above in the representation of an image signal occur. It is accordingly necessary to adapt the image signal with its coded image information to the brightness distribution of the monitor so as to achieve a perceptionally optimized rendering. The image signal comprises, for example, a coded medical image in its original recorded form, which is supplied to the correction unit. The correction unit receives this image signal, which contains gray tone values from a set M of original gray tones. This set M of the original gray tones is associated with the set K of the correction gray tones in dependence on the brightness distribution of the monitor. This leads to the generation of s digital output image signals which are each subjected to a digital/analog conversion.

The monitor is driven by a number s of electron rays, s being a given natural number. The s analog output image signals are each supplied to one of the s electron rays which drive the monitor. The s electron rays are imaged in one point of the monitor, so that a mixing of several gray tone values takes place here. The original gray tone, which does not correspond to the perceptionally optimized representation, is displayed with brightness correction owing to this mixing of the s electron rays in one point.

In this arrangement according to the invention, input gray tones are assigned to several output gray tones in a correction unit. Each of the several output gray tones is supplied to an electron ray for displaying the output gray tones on the monitor. The several electron rays are imaged in one point of the monitor, so that a mixing of the several output gray tones is achieved. Thus a different gray tone is mixed for each input gray tone from several output gray tones, and a perceptionally optimized display of the image signal on the monitor is created.

The n-bit wide image signal is capable of containing $2^n$ different gray tone values. These original gray tones are assigned to s correction sets of $2^n$ gray tone values each in the correction unit. The number of the correction sets is determined here by the number s of electron rays. Each correction set, for example, comprises $2^n$ different correction gray tones. Each original gray tone is associated with a gray tone value from each correction set, so that s output image signals are generated. The assignment of s correction gray tone values to each original gray tone value achieves the adaptation of the brightness distribution of the monitor to the optimum perceptional brightness distribution.

The number of possible gray tones which can be displayed is increased through the assignment of several correction gray tones.

In a further embodiment of the invention it is found to be advantageous to arrange a photosensor in the vicinity of the monitor, which sensor influences the correction unit in dependence on the ambient light. The use of such a photosensor involves the use of several correction tables for different ambient brightness values. Depending on the value measured by the ambient light sensor, the corresponding correction table is then selected during operation of the device.

To determine the brightness distribution of the monitor, calibration measurements are carried out with a luminance sensor. The luminance curves are measured individually for each electron ray and collectively for all electron rays. The luminance sensor measures the brightness of the pixels directly on the surface of the picture tube of the monitor. The luminance curves thus determined are supplied to the correction unit for calculating the correction tables.

In a further embodiment of the invention, it is advantageous to use a photosensitive sensor first for determining the luminance curves. After the luminance curves have been laid down, this sensor is utilized as an ambient light sensor through a change in its orientation.

In an alternative embodiment of the invention, the luminance curves of the monitor are synthetically generated through a parameter description. Since the brightness distribution of the monitor also depends on user-specific settings, it is very cumbersome to measure all possible settings in advance and then to associate the original gray tone values with the correction gray tone values in accordance therewith. The luminance curves can be approximated with a very good degree of correspondence by a simple parameter description through the creation of a calculation instruction in which the luminance values depend on the brightness and contrast values. The brightness distributions or luminance curves are then calculated, and subsequently the assignation of the original gray tone values to the correction gray tones is carried out in the look-up table so as to set a display mode which is perceptionally optimized.

In a further embodiment of the invention, it is found to be advantageous in a triple-gun monitor, which is driven by three electron rays, to assign three correction sets of gray tones to the set of original gray tones of the image signal in the correction unit for generating three output image signals. One gray tone value from each of the three correction sets is then assigned to each gray tone value from the original gray tones. These three output image signals, after a digital/analog conversion, are each supplied to a respective electron ray of the triple-gun monitor and are imaged in a common point on the monitor with a corrected gray tone value for each original gray tone value to be pictured.

It is an advantage of this invention that three-channel graphic cards for color monitors can be used. These three-channel graphic cards are complemented with a suitable correction unit for adapting the brightness distribution of the monitor to the optimum perceptional brightness distribution. This means that no new hardware need be developed.

In a further embodiment of the invention, it is advantageous that the n-bit wide image signal is supplied to s correction sets $K_s$, in the correction unit, which sets have a bit depth smaller than n. The assignment of s correction sets with corresponding gray tone values renders it possible to provide the correction sets with fewer gray tone values than the original number of gray tones, thanks to the subsequent mixing of the electron rays. When the three output image signals $A_s$ are mixed, a theoretical number of gray tone values is possible corresponding to the permutation of the three gray tones of the correction sets, so that the quantity of the correction gray tones can be smaller than the quantity of the original gray tones. The digital/analog conversion may accordingly be designed to have a processing width smaller than n as well.

Such gray tone images are recorded by X-ray devices, computer or magnetic resonance tomography devices, or ultrasound devices.

DETAILED DESCRIPTION OF THE PRESENTLY PREFERRED EMBODIMENTS

Figure 1:
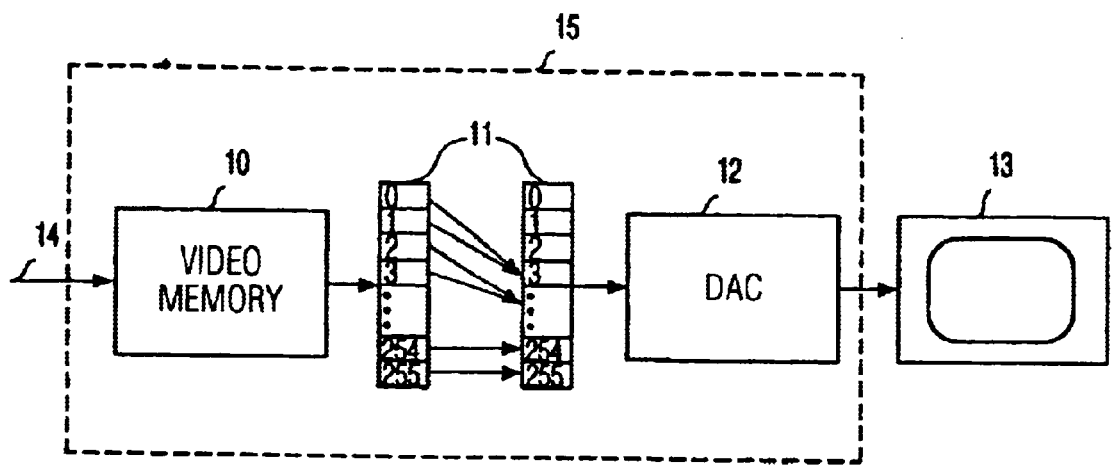
FIG. 1 diagrammatically shows a prior-art correction procedure.

FIG. 1 shows a graphic card 15 with a correction unit 11 in the form of a look-up table which has an 8-bit input width and an 8-bit output width. A digital video image with an 8-bit resolution is read into a video memory 10 by an input signal 14. This video image stored in the video memory 10 is passed on to the correction unit 11. A correction or adaptation of the brightness values is carried out here for each gray tone value. It is apparent that, in the case of low gray tone values, for example 0 and 1, both values are set for the gray tone value 3 in the adaptation. It is not until we come to the brighter region, at gray tone values 254 and 255, that a 1:1 translation is carried out. New values are assigned to the digital image data in a look-up table in this correction procedure, which values are subsequently converted into an analog signal in the digital/analog converter ("DAC") 12, which signal is supplied to the monitor 13. Brightness values are generated by this correction which lie closer to the optimum perceptional brightness distribution. In the arrangement shown in FIG. 1, however, gray tone values are lost in the correction process.

Figure 2:
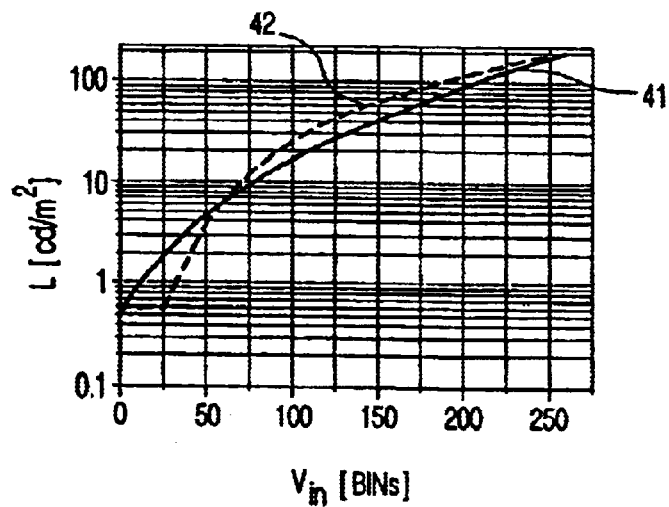
FIG. 2 is a diagram showing the brightness distribution of the monitor in comparison with the optimum perceptional brightness distribution.

FIG. 2 shows two curves in a diagram. Luminance values are plotted here against individual binary gray tone values. Curve 42 is a typical luminance curve of a monitor. The insufficient rendering of low gray tone values is clearly apparent. Curve 41 is a perceptionally optimum curve. In this curve, the low gray tone values are also associated with distinguishable luminance values.

Figure 3:
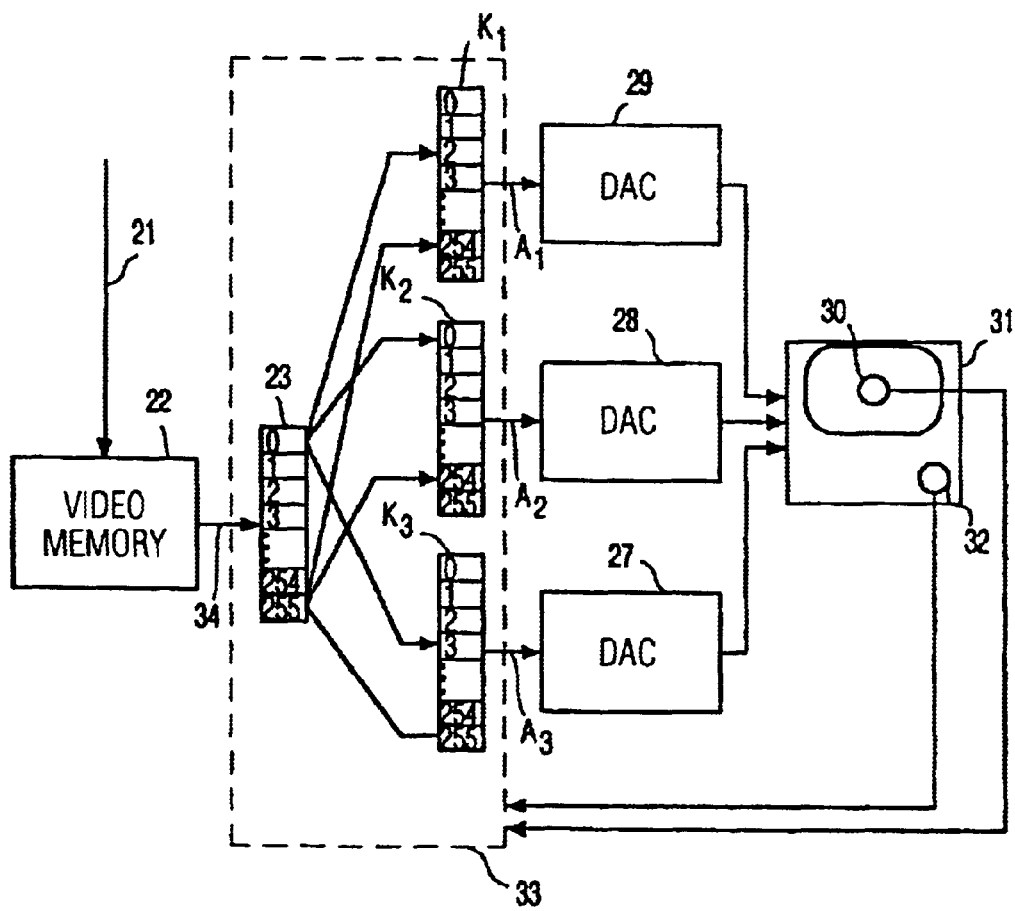
FIG. 3 is a diagram showing the device according to the invention.

FIG. 3 is a diagram of the device according to the invention. Here a digital image signal 21 with, for example, 256 different gray tone values coded in an 8-bit signal is supplied for storage to a video memory 22. The 8-bit coded gray tone values are fed to a correction unit 33. The correction unit 33 is implemented, for example, as a look-up table. Three gray tone values from the three correction sets $K_s$, are assigned to each gray tone value of the 8-bit wide image signal 34 in this correction unit 33. It is evident here that many more gray tone values can be generated from 256 possible gray tone values of the original gray tones 23. A total number of gray tone values can be generated which corresponds to the permutation of the three gray tone values from $K_1$, $K_2$, and $K_3$. Let us assume by way of example that the gray tone value 0 (black) is assigned once to the gray tone value 2 in the correction set $K_1$, then to the gray tone value 0 in the correction set $K_2$, and finally to the gray tone value 3 in the correction set $K_3$. It is apparent here that a gray tone value is generated which lies neither at a gray tone value of 0, 1, 2, or 3, but which lies between 2 and 3 in the imaging of the three electron rays (not shown) on the monitor 31 on the basis of these three different gray tone values. These gray tone values pinpointed in the three individual correction sets $K_1$, $K_2$, and $K_3$ are supplied to respective 8-bit wide digital/analog converters ("DAC") 27, 28, and 29. After being converted into analog signals, these digital output image signals $A_s$ are each supplied to an electron ray of the triple-gun monitor 31. The three rays picture the relevant gray tone values in a common pixel. As a result, the three possible individual gray tone values are mixed in this pixel. The image is thus displayed with brightness distribution correction on this triple-gun monitor 31.

The luminance sensor 30 carries out a calibration. It is necessary to know the luminance curves of the monitor for the formation of the assignment instruction for the look-up table in the correction unit 33. To calibrate the device, the brightness distributions in the form of the luminance curves of the three electron rays are individually recorded. A luminance curve is also recorded for all three electron rays together. These luminance curves are supplied to the correction unit 33. The assignment of the gray tone values of the correction sets to the original gray tone values is carried out on the basis of these luminance curves.

The correction unit 33 is adapted to various ambient light situations by the photosensor 32, which is arranged at the front of the monitor 31. Several correction tables are created for several different ambient light values. That correction table which corresponds to the measured ambient light is selected during operation of this device according to the invention.

If the two sensors are combined, a photosensor is first used for recording the luminance curves of the monitor. Then it is so oriented that it can detect the ambient light. Most monitors do not comprise an ambient light sensor, so that this combination also renders it possible to take into account changing ambient light conditions in the instruction for assigning the gray tone values.

Since the creation of the correction tables for different brightness and contrast settings is very cumbersome and occupies much memory space, the correction tables are not fully memorized. A determination of a functional interrelationship between these user-specific settings and the calibration measurements carried out will render it possible to calculate the luminance curves for all user-specific values. Only those user-specific values by which the luminance curves are calculated are stored in the memory then. The luminance values or gray tone values of the calculated luminance curve are then adapted to a perceptionally improved representation curve (FIG. 2, 41) in an assignment instruction.

The video memory 22 and the three 8-bit digital/analog converters as well as the correction unit 33 are arranged on a graphic card used for color monitors. The correction unit may be present as a programmable memory on the graphic card, in dependence on the complexity. Alternatively, it may be present in a separate hardware unit with its own controller. An arrangement of the components mentioned directly in the monitor is also possible.

This device renders it possible to correct a medical image with a higher resolution than that of the processing width of the digital/analog converter and to display this image. A medical image, for example 10-bit coded, can contain 1024 different gray tones. With three correction sets, each containing only 256 different gray tones and 8-bit coded, it is possible to display 16.8 million gray tone combinations. The three output image signals thus generated with the gray tones of the correction sets $K_s$, can then be converted with a small processing width in the digital/analog converters.

A table is shown below in which this assignment is indicated.

| Gray tone input value | Value for A1 | Value for A2 | Value for A3 |
| --- | --- | --- | --- |
| 0 | 0 | 0 | 0 |
| 1 | 2 | 5 | 3 |
| 2 | 3 | 4 | 3 |
| 3 | 5 | 2 | 5 |
| . | | | |
| . | | | |
| 1023 | 254 | 253 | 255 |
| 1024 | 255 | 255 | 255 |

What is claimed is:

1. A display device for correcting a brightness distribution of gray tone images displayed by a monitor driven by a plurality of electron rays, said display device comprising:
    a correction unit operable to generate a plurality of output digital image signals in response to a reception of an input digital image signal representative of a set of gray tone values, each output digital image signal representative of a set of correction gray tone values corresponding to the set of gray tone values of the input digital image signal, the correction gray tone values collectively being representative of a correction of a brightness distribution of the gray tone values; and
    a digital-to-analog conversion unit operable to convert the output digital image signals into a plurality of output analog image signals, said digital-to-analog conversion unit further operable to provide each output digital image signal to one of the electron rays whereby the brightness distribution of the gray tone images displayed by the monitor is corrected; and
    a photosensor operable to measure an ambient light surrounding the monitor and to communicate the measured ambient light to said correction unit.

2. A display device for correcting a brightness distribution of gray tone images displayed by a monitor driven by a plurality of electron rays, said display device comprising:
    a correction unit operable to generate a plurality of output digital image signals in response to a reception of an input digital image signal representative of a set of gray tone values, each output digital image signal representative of a set of correction gray tone values corresponding to the set of gray tone values of the input digital image signal, the correction gray tone values collectively being representative of a correction of a brightness distribution of the gray tone values; and
    a digital-to-analog conversion unit operable to convert the output digital image signals into a plurality of output analog image signals, said digital-to-analog conversion unit further operable to provide each output digital image signal to one of the electron rays whereby the brightness distribution of the gray tone images displayed by the monitor is corrected; and
    a luminance sensor operable to detect the brightness distribution of the gray tone images and to communicate the detected brightness distribution to said correction unit.

3. A display device for correcting a brightness distribution of gray tone images displayed by a monitor driven by a plurality of electron rays, said display device comprising:
    a correction unit operable to generate a plurality of output digital image signals in response to a reception of an input digital image signal.representative of a set of gray tone values, each output digital image signal representative of a set of correction gray tone values corresponding to the gray tone values of the input digital image signal, the correction gray tone values collectively being representative of a correction of a brightness distribution of the gray tone values;
    a digital-to-analog conversion unit operable to convert the output digital image signals into a plurality of output analog image signals, said digital-to-analog conversion unit further operable to provide each output digital image signal to one of the electron rays whereby the brightness distribution of the gray tone images displayed by the monitor is corrected;
    a photosensor operable to measure an ambient light surrounding the monitor and to communicate the measured ambient light to said correction unit; and
    wherein said correction unit is further operable to select the correction gray value tones based on the measured ambient light.

4. The display device of claim 3,
    wherein the input digital image signal includes n number of bits representative of $2^n$ quantity of gray tone values; and wherein each output digital image signal includes n number of bits representative of $2^n$ quantity of correction gray tone values.

5. The display device of claim 3,
wherein the input digital image signal includes n number of bits representative of $2^n$ quantity of gray tone values; and
wherein said correction unit includes a plurality of correction sets, each correction set including $2^n$ quantity of correction gray tone values.

6. The display device of claim 3,
wherein the input digital image signal includes n number of bits representative of $2^n$ quantity of gray tone values; and
wherein each output digital image signal includes one or more bits representative of a quantity of correction gray tone values less than the $2^n$ quantity of gray tone values.

7. The display device of claim 3,
wherein the input digital image signal includes n number of bits representative of $2^n$ quantity of gray tone values; and
wherein said correction unit includes a plurality of correction sets, each correction set including a quantity of correction gray tone values less than the $2^n$ quantity of gray tone values.

8. The display device of claim 3, wherein said correction unit is further operable to calibrate the selected correction gray tones in response to a reception of one or more signals indicative of the brightness distribution of the gray tone images.

9. A display device for correcting a brightness distribution of gray tone images displayed by a monitor driven by a plurality of electron rays, said display device comprising:
 a correction unit operable to generate a plurality of output digital image signals in response to a reception of an input digital image signal representative of a set of a plurality of gray tone values, each output digital image signal representative of a set of correction gray tone values corresponding to the gray tone values of the input digital image signal, the correction gray tone values collectively being representative of a correction of a brightness distribution of the gray tone values;
 a digital-to-analog conversion unit operable to convert the output digital image signals into a plurality of output analog image signals, said digital-to-analog conversion unit further operable to provide each output digital image signal to one of the electron rays whereby the brightness distribution of the gray tone images displayed by the monitor is corrected;
 a luminance sensor operable to detect the brightness distribution of the gray tone images and to communicate the detected brightness distribution to said correction unit; and
 wherein said correction unit is further operable to calibrate the correction gray tones based on the detected brightness distribution of the gray tone images.

10. The display device of claim 9,
wherein the input digital image signal includes n number of bits representative of $2^n$ quantity of gray tone values; and
wherein each output digital image signal includes n number of bits representative of $2^n$ quantity of correction gray tone values.

11. The display device of claim 9,
wherein the input digital image signal includes n number of bits representative of $2^n$ quantity of gray tone values; and
wherein said correction unit includes a plurality of correction sets, each correction set including $2^n$ quantity of correction gray tone values.

12. The display device of claim 9,
wherein the input digital image signal includes n number of bits representative of $2^n$ quantity of gray tone values; and
wherein each output digital image signal includes one or more bits representative of a quantity of correction gray tone values less than the $2^n$ quantity of gray tone values.

13. The display device of claim 9,
wherein the input digital image signal includes n number of bits representative of $2^n$ quantity of gray tone values; and
wherein said correction unit includes a plurality of correction sets, each correction set including a quantity of correction gray tone values less than the $2^n$ quantity of gray tone values.

* * * * *